(12) United States Patent
Wilson et al.

(10) Patent No.: US 7,069,117 B2
(45) Date of Patent: Jun. 27, 2006

(54) ELECTRICAL POWER DISTRIBUTION CONTROL SYSTEMS AND PROCESSES

(75) Inventors: Thomas L. Wilson, Spokane, WA (US); Kenneth M. Hemmelman, Spokane, WA (US)

(73) Assignee: Programmable Control Services, Inc., Spokane, WA (US)

( * ) Notice: Subject to any disclaimer, the term of this patent is extended or adjusted under 35 U.S.C. 154(b) by 724 days.

(21) Appl. No.: 10/117,723

(22) Filed: Apr. 1, 2002

(65) Prior Publication Data

US 2003/0187550 A1 Oct. 2, 2003

(51) Int. Cl.
G05D 11/00 (2006.01)

(52) U.S. Cl. .......... 700/295; 700/291; 713/320; 363/25; 327/101

(58) Field of Classification Search .......... 700/291, 700/295, 297; 713/320, 321, 323; 363/25; 327/101
See application file for complete search history.

(56) References Cited

U.S. PATENT DOCUMENTS

| | | | |
|---|---|---|---|
| 3,872,286 A * | 3/1975 | Putman | 705/412 |
| 4,313,081 A | 1/1982 | Smith | |
| 4,413,189 A | 11/1983 | Bottom, Jr. | |
| 4,419,619 A | 12/1983 | Jindrick et al. | |
| 4,449,054 A | 5/1984 | Jop | |
| 4,630,220 A | 12/1986 | Peckinpaugh | |
| 4,695,737 A | 9/1987 | Rabon et al. | |
| 4,974,140 A | 11/1990 | Ibo et al. | |
| 5,117,175 A | 5/1992 | Pettigrew et al. | |
| 5,422,561 A | 6/1995 | Williams et al. | |
| 5,796,628 A * | 8/1998 | Chiang et al. | 700/295 |
| 5,963,457 A * | 10/1999 | Kanoi et al. | 700/291 |
| 6,452,289 B1 * | 9/2002 | Lansberry et al. | 307/25 |
| 6,625,520 B1 * | 9/2003 | Chen et al. | 700/286 |
| 6,633,823 B1 * | 10/2003 | Bartone et al. | 702/57 |
| 6,772,052 B1 * | 8/2004 | Amundsen et al. | 700/291 |
| 2001/0034569 A1 * | 10/2001 | Yamamoto et al. | 700/295 |

OTHER PUBLICATIONS

"Annex D Load tap changer control with remote voltage measurements (informative)," IEEE Standards Draft ©2000, pp. D1-D11.

* cited by examiner

Primary Examiner—Leo Picard
Assistant Examiner—Sheela S. Rao
(74) Attorney, Agent, or Firm—Reidlaw, L.L.C.; John S. Reid

(57) ABSTRACT

In one aspect, the present invention includes a power adjustment apparatus. The apparatus includes a local controller and one or more sensors distributed within a power grid. The sensors are configured to assess conditions including power consumption and delivered voltage level and are configured to transmit data representative of the assessed conditions to the local controller. The apparatus also includes a device associated with the one or more sensors, configured to adjust an output power level in response to commands from the local controller. The device is deployed at an associated location within the power grid. The device is configured to increase an associated output electrical parameter when the local controller determines that such will reduce power consumption.

35 Claims, 6 Drawing Sheets

# ELECTRICAL POWER DISTRIBUTION CONTROL SYSTEMS AND PROCESSES

TECHNICAL FIELD

The invention relates to electrical power distribution systems, processes and apparatus and power management in power distribution systems. More particularly, the present invention relates to power conservation and selective power regulation in power distribution systems.

BACKGROUND OF THE INVENTION

In electrical power distribution systems, several needs compete and must be simultaneously considered in managing electrical power distribution. A first concern has to do with maintaining delivered electrical power voltage levels within predetermined limits. A second concern relates to overall efficiency of electrical power generation and distribution. A third concern relates to these and other concerns in light of changing electrical loading of the system and variations in the character of the loading. A fourth concern relates to power system management under conditions associated with an increased probability of compromise of large scale ability to deliver appropriate power.

It is generally desirable to manage a power grid to reduce overall power consumption while maintaining adequate delivered voltage minimum and maximum levels across the system. In other words, the voltage levels actually delivered to various users need to be kept within predetermined limits while delivering power efficiently, without undue power loss in the delivery system or power grid, including the power generation equipment. As power usage within the system changes, in accordance with diurnal, weekly and seasonal factors, among others, need for regulation of power distribution changes as well. To an extent, some of these changes are reasonably predictable, however, other aspects of these changes may not be readily predictable.

Predictable changes in system loading are forecast by integrating power draw over time and considering this draw together with other factors, such as increased outdoor temperature and known diurnal variation patterns. For example, when summer heat results in increased power draw for air conditioning during the course of the day, fast food power draw associated with the end of the work day may indicate that a power shortage is imminent. Typically, measurements are made every minute or so, and adjustments to voltage are made perhaps once an hour. This is called "conservation voltage reduction" and is intended to reduce overall energy draw.

However, compromise of power delivery capability due, for example, to extreme weather conditions (e.g., gale winds affecting the distribution system) or unforeseen decrease in available power (e.g., generator malfunction) is not necessarily amenable to precise forecasting but is observable. As a result, there is need for dynamic system adjustment in response to observed changes in system capacity, conditions and loading.

Increased probability of compromise of large scale ability to deliver appropriate power may include increased probability of system-wide failure or blackout of an area, where "system-wide failure" could mean either a large grid being shut down or a smaller grid being isolated from a larger grid, with a potential result that the smaller grid then would be shut down or malfunction. In some cases, grid failure may be caused by automated shutdown of one or more generators in response to determination of grid conditions ill-suited to the generator in order to obviate catastrophic generator failure.

The conditions associated with an increased probability of compromise of large scale ability to deliver appropriate power are varied, and can range from "brownout" situations to complete disruption of electrical service or "blackouts". Some types of power consumption relate to relatively vital concerns, such as hospitals, infrastructural support systems (telephone, police, fire protection, electrical traffic signals and the like) and others relate to more quotidian concerns, such as air conditioning, fast food operations and industrial operations such as aluminum smelters and the like.

The latter types of concerns can present a high electrical draw at certain times of day. However, interruption of power delivery to such operations does not usually present life-threatening consequences when such operations are without electrical power.

Further, in the event of severe disruption or demand, grid systems used for delivery of electrical power can experience catastrophic failure when load conditions presented to generators in the system are such that one or more electrical generators are automatically shut down or disconnected from the system. This situation obviously places increased demand or even less suitable loading conditions on other generators or grids to which the grid is coupled. As a result, other generators or grids coupled to the affected grid may disconnect from the affected grid, potentially resulting in a blackout. Such blackouts can be extremely widespread in electrical generation and distribution systems employed multiple coupled grids each having electrical generation capability.

Prior art power regulation systems include opening switches at a power station or substation to remove load components, or sending out trucks with technicians to manually open switches to remove portions of the load from the system, or to manually adjust power regulators and set points. These methods are not amenable to rapid, dynamic load adjustment or rapid, dynamic power management.

Another prior art system provides equipment at the user site that disables high load appliances, such as hot water heaters, on demand. This may be based on forecasting of anticipated excess demand. Such systems are known as "demand side control" systems. These tend to be expensive, in part because the number of control switches is high.

Needed are systems, apparatus and processes for (i) optimizing efficiency of power delivery while maintaining delivered voltage levels within acceptable limits under changing conditions for electrical power demand and (ii) coping with conditions associated with an increased probability of compromise of large scale ability to deliver appropriate power in such a way as to avoid compromise of critical concerns and to further avoid catastrophic electrical system failure.

SUMMARY OF THE INVENTION

In one aspect, the present invention includes a system for adjustment of power consumption within a power grid. The system includes a group controller and a plurality of sensors distributed within the power grid. The sensors are configured to assess conditions including power consumption and delivered voltage level and are configured to transmit data representative of the assessed conditions to the group controller. The system also includes a plurality of devices each configured to provide power control. A respective local controller is associated with a respective one of the plurality of devices. Each of the plurality of devices is configured to adjust an associated output electrical parameter in response to commands from either the group or local controller. Individual ones of the plurality of devices are distributed to respective locations within the power grid. Each of the plurality devices is configured to increase or decrease the associated output electrical parameter when either the group controller or the associated local controller determines that such will reduce system power consumption.

In another aspect, the present inventions includes a power adjustment apparatus. The apparatus includes a local controller and one or more sensors distributed within a power grid. The sensors are configured to assess conditions including power consumption and delivered voltage level and are configured to transmit data representative of the assessed conditions to the local controller. The apparatus also includes a device associated with the one or more sensors and configured to adjust an output power level in response to commands from the local controller. The device is configured to be deployed at an associated location within the power grid. The device is configured to increase an associated output electrical parameter when the local controller determines that such will reduce power consumption.

In another aspect, the present invention includes a process for adjusting power consumption within a power grid. The power grid includes a controller and a plurality of sensors distributed within the power grid. The sensors are configured to assess conditions including power consumption and delivered voltage level and are configured to transmit data representative of the assessed conditions to the controller. The power grid further includes a plurality of devices each configured to adjust output voltage in response to commands from the controller. Individual ones of the plurality of devices are configured to be distributed to an associated location within the power grid. The process includes determining, by the controller, when an increase in an output parameter from one device of the plurality of devices will reduce system power consumption. The process also includes increasing or decreasing the associated output electrical parameter in response to the controller determining that such will reduce system power consumption.

In another aspect, the present invention contemplates a process for power management in a power adjustment apparatus. The apparatus includes a controller and one or more sensors distributed within a power grid. The sensors are configured to assess conditions including power consumption and delivered voltage level and are configured to transmit data representative of the assessed conditions to the controller. The apparatus also includes a device configured to adjust output voltage in response to commands from the controller. The device is deployed at an associated location within the power grid. The process includes determining, by the controller, that increasing an output electrical parameter associated with the device will reduce power consumption, and increasing an output electrical parameter associated with the device in response to the controller determining that such will reduce power consumption.

In another and further aspect, the present invention includes a controller that is configured to increase stability of a power distribution system. The power distribution system includes at least one device associated with and responsive to commands from the controller. The device is configured to adjust a delivered voltage level supplied to one or more users, and is configured to be deployed at an associated location within the power grid. The controller is further configured to determine that conditions associated with decreased stability of the power distribution may exist and first adjust the at least one device, in response to the determination that conditions associated with decreased stability of the power distribution may exist, to increase delivered voltage in at least a portion of the power distribution system when the controller determines that this will increase overall system stability.

BRIEF DESCRIPTION OF THE DRAWINGS

Embodiments of the invention are described below with reference to the following accompanying drawings.

DETAILED DESCRIPTION

This disclosure of the invention is submitted in furtherance of the constitutional purposes of the U.S. Patent Laws "to promote the progress of science and useful arts" (Article 1, Section 8).

Figure 1:
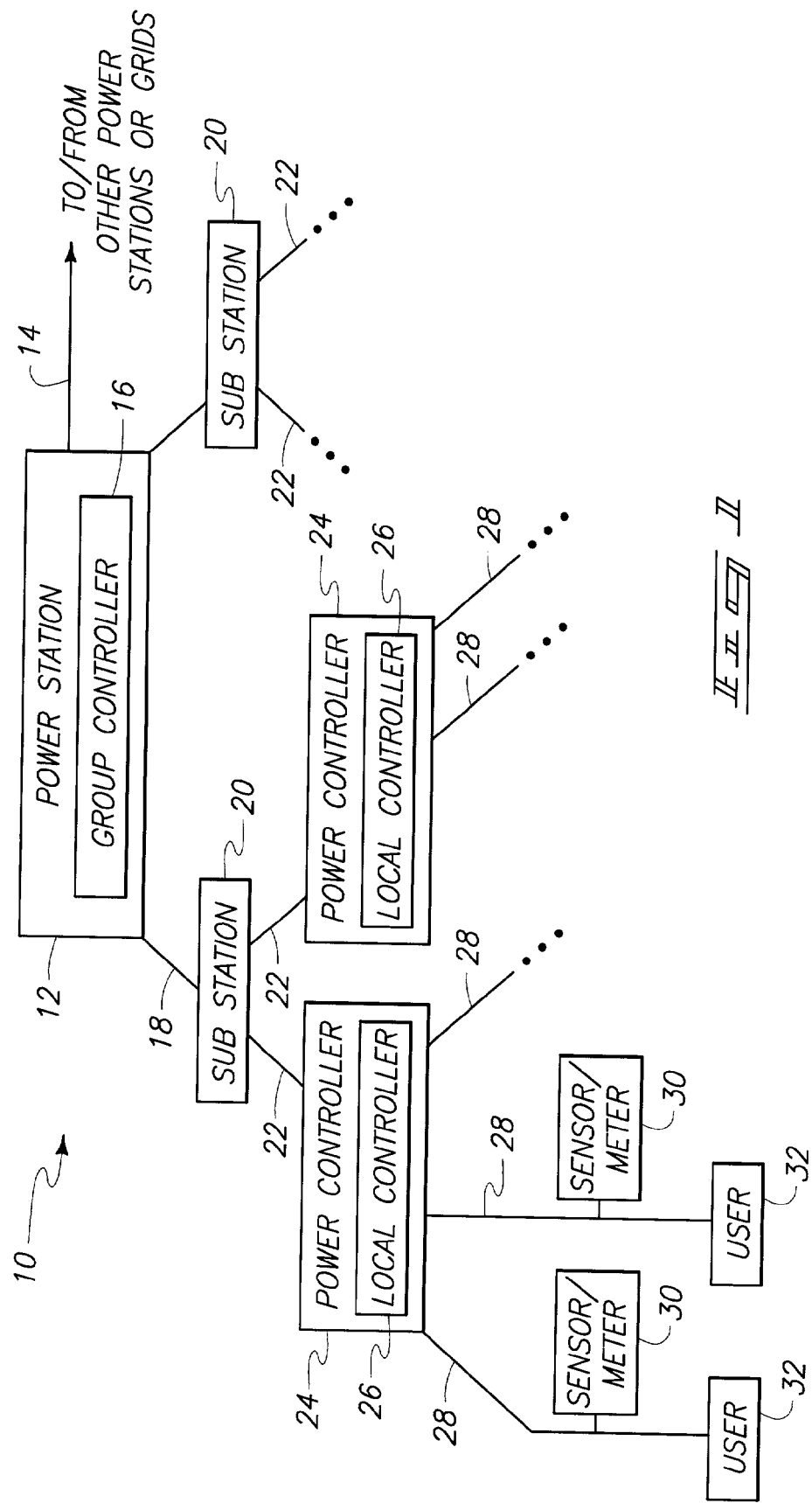
FIG. 1 is a simplified block diagram of an electrical power distribution system, in accordance with an embodiment of the present invention.

FIG. 1 is a simplified block diagram of an electrical power distribution system 10, in accordance with an embodiment of the present invention. The power distribution system 10 includes a power station 12, that may be coupled to a power source or sink via a high voltage bus 14. In one embodiment, the power station 12 includes one or more generators. In one embodiment, the power station 12 distributes power delivered via the bus 14. In one embodiment, the power station 12 delivers power to other power distribution systems via the bus 14. As will be appreciated, the role of the power station 12 may change with time and demand, i.e., it may supply excess power to other systems when local load conditions permit and it may be supplied with power at other times when local load conditions require such.

The power station 12 includes one or more group controllers 16. Power is distributed via buses 18 from the power station 12 to one or more substations 20. In turn, each substation 20 delivers power further "downstream" via buses 22. It will be appreciated that a series of voltage transformations are typically involved in transmission and distribution of electrical power via the various power stations 12 and substations 20 and that the system 10 being described exemplifies such systems that may include additional or fewer layers of transformation and distribution.

The substation 20 delivers electrical power via buses 22 to one or more power regulation devices 24, which may include a local controller 26. In turn, the power regulation devices 24 deliver electrical power further downstream via buses 28. Ultimately, electrical power is coupled to a sensor 30 and/or to a user 32. Sensors 30 tend to be associated with critical loads such as hospitals.

In one embodiment, the electrical power is coupled to a sensor 30 capable of determining electrical parameters associated with power consumption and transmitting those assessed parameters to the associated local controller 26 and/or to the group controller 16. It will be appreciated that any medium suitable to data transmission may be employed, such as radio links, which may utilize spread spectrum coding techniques, point-to-point radio links, fiber optical links, leased lines, data signals coupled via power lines or buses, telephone links or other infrastructural data communications paths. In some embodiments, such may also be conveniently collateral to power distribution system elements (e.g., coaxial cables employed for data transmission such as are often employed in cable television systems).

In one embodiment, the sensor 30 measures voltage and is also part of an electrical meter used for measuring the amount of electrical power used and thus for determining billing data, such as a conventional Automatic Meter Reader or AMR. In one embodiment, the sensor 30 is equipped to assess line voltage delivered to the user 32, or "delivered voltage". In one embodiment, the sensor 30 is equipped to measure current.

In one embodiment, the local controller is configured to respond to several associated sensors. This may be accomplished by dynamically determining which one or ones of an associated plurality of sensors is providing data most relevant to determining how to most effectively adjust the associated output electrical parameter. Effective control of power delivered by the associated power regulation device 24 is determined by "voting" between the associated sensors, dependent upon changes in current draw in different loads controlled by the power regulation device 24, load shifts or voltage changes. In one embodiment, the "vote" tends to be responsive to the sensor that results in optimal power conservation.

In one embodiment, the sensor 30 is equipped to assess power factor, also known as VAR or Volt Amperes Reactive, that is, the phase shift induced by inductive or capacitive loads. Power factor can be significant because transmission losses known as $I^2R$ losses can increase when the currents associated with driving the load increase without necessarily delivering more total work to the load.

These losses can result in situations where the total power drawn from the power station 10 or substation 20 actually decreases when line voltage to the user 32 increases. One example of such a situation is where the load is highly inductive and the amount of work accomplished is controlled primarily by the amount of current drawn by the load, e.g., loads including electrical motors.

Conventional power distribution systems provide some correction of or management of power factor or VAR by switching reactive elements, such as shunt capacitors, into or out of the system at strategic locations. These conventional systems do not attempt to reduce losses by voltage adjustment.

Conventional Supervisory Control And Data Acquisition (SCADA) systems have not in past been associated with incremental voltage controllers. In particular, such systems have not been affiliated with controllers that are equipped to test for conditions where an increase in delivered voltage can reduce overall power consumption by providing improved power factor.

In the present, inventive system, such a controller advantageously also effectuates data collection and logging. In one embodiment, at least the group controller 16 records a conventional system data log for tracking voltage, current, kiloWatt hours and power factor or kilo volt-amp reactive power and the like over time. In one embodiment, at least the group controller 16 records a conventional event log for tracking load tap control data, voltage regulation data and breaker operations and the like over time. In one embodiment, at least the group controller 16 records a conventional status log for tracking position of load tap controls, voltage regulator setting, breaker settings and the like over time.

In one embodiment, at least the group controller 16 records minimum and maximum values for conventional electrical parameters such as voltage, kiloWatt flow, KVAR and the like versus time. In one embodiment, such conventional data are collected at regular intervals, such as every thirty seconds or every minute. In one embodiment, additional such conventional data logs are recorded by local controllers 26 as well.

Figure 2:
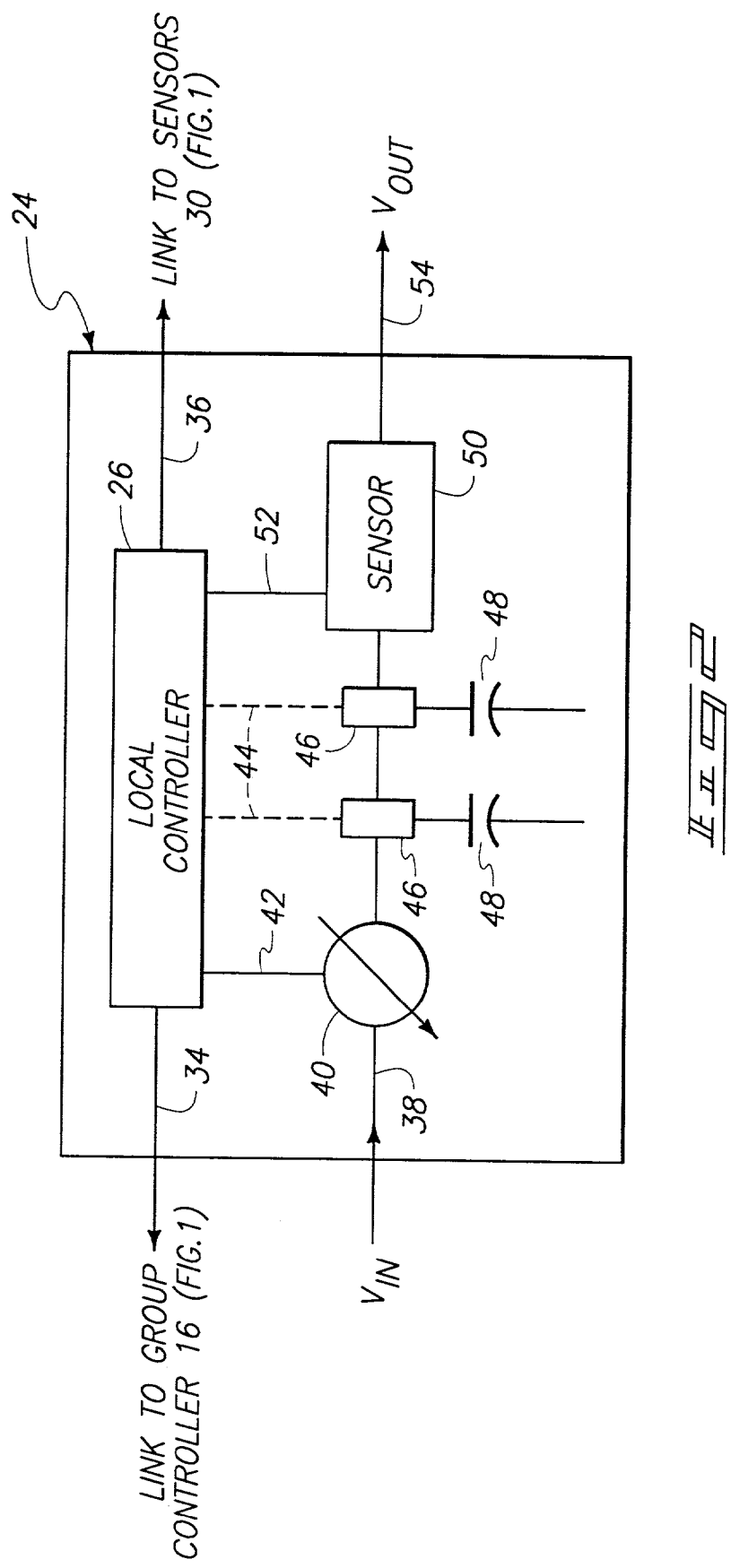
FIG. 2 is a simplified block diagram of a power controller for use in the system of FIG. 1, in accordance with an embodiment of the present invention.

FIG. 2 is a simplified block diagram of a power controller 24 for use in the system 10 of FIG. 1, in accordance with an embodiment of the present invention. The power controller 24 includes the local controller 26 of FIG. 1. The local controller 26 is linked to the group controller 16 via a data path 34 and is linked to the downstream sensors 30 of FIG. 1 via a data path 36. The power controller 24 accepts input electrical energy $V_{IN}$ via a bus 38 that is coupled to a voltage regulator 40. In one embodiment, the voltage regulator 40 comprises a conventional autotransformer employing a make-before-break variable tap that is set in conformance with command signals communicated from the local controller 16 via a data path 42.

The power controller 24 also optionally includes a data path 44 coupled to switches 46. The switches 46 couple elements 48 for power factor management into or out of the circuit in response to commands from the local controller 26. In one embodiment, the elements 48 comprise conventional capacitors that are switched into or out of the circuit in conformance with commands from the local controller 26.

A sensor 50 is coupled to the local controller 26 via a data path 52. The sensor 50 measures electrical parameters associated with electrical energy leaving the power controller 24, such as kiloWatt hours, current, voltage and/or power factor. The power controller 24 delivers electrical energy $V_{OUT}$ for downstream distribution via a bus 54.

In one embodiment, the local controller 26 regulates power delivery subject to overriding commands from the group controller 16. In one embodiment, the power controller 24 increments (or decrements) line voltage at the 120/240 volt distribution level. In one embodiment, the power controller 24 changes output voltage in increments of 5/8%, or about 0.75 volt steps at the 120 volt level. In one embodiment, when larger changes in voltage are desirable, the power controller 24 allows a stabilization interval of between forty seconds and two minutes between an increment and evaluation of system parameters prior to making a next incremental voltage change.

In one embodiment, the power controller 24 maintains delivered line voltage in band of voltages ranging from about 110 volts or 114 volts to about 126 volts to 129 volts, with 117 volts being exemplary, and with a reduced level of about 110 to 100 volts being applicable in emergency or brownout situations.

In one embodiment, multiple power controllers 24 are situated downstream of a master controller 24. For example, in aluminum smelting plants, such an arrangement may be advantageous in order to provide a recommended voltage or current to the smelting pots, and to optimize energy costs.

In silicon refining plants, power control can be crucial to maintaining the melt at the appropriate temperature and also for maintaining an appropriate rotation speed in Czochralski crystal growth apparatus. As a result, the criticality of power regulation depends on the end use to which the user puts the power. Programming parameters used in the local controller 26 of the power controllers 24 can be set in light of these needs to effect the desired power regulation.

In some power distribution situations, power control is important because the contractual arrangements between the user and the service provider result in increased power rates for a period, such as a year, if a maximum or peak amount of power contracted for is exceeded even once. Accordingly, such users have incentives to regulate power use to obviate exceeding that contractual amount.

Figure 3:
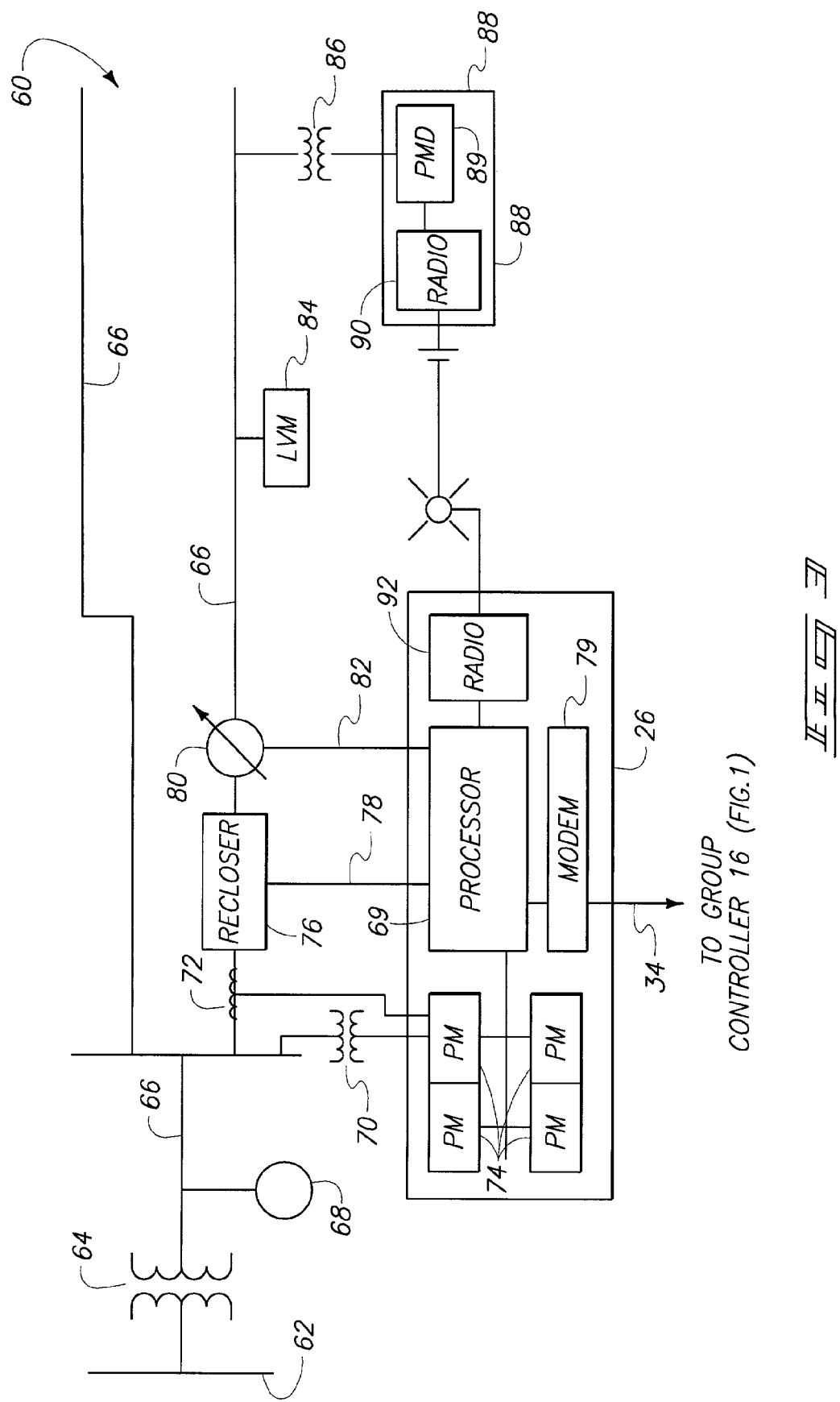
FIG. 3 is a simplified block diagram of an example of a portion of a power distribution system using the power controller of FIG. 2, in accordance with an embodiment of the present invention.

FIG. 3 is a simplified block diagram of an exemplary system 60 illustrating application of the power controller 24 of FIG. 2, in accordance with an embodiment of the present invention. In the exemplary system 60, electrical power is distributed at a first voltage, such as 115 kiloVolts, over bus 62. The electrical power is stepped down to a reduced voltage, such as 12.5 kiloVolts, by a transformer 64, and is transmitted downstream via a bus 66. A billing meter 68 may be coupled to the bus 66. The local controller 26 includes one or more processors 69.

Taps 70 and 72 are coupled to a power monitor PM 74 in the local controller 26 to allow the processor 69 to monitor electrical parameters associated with the power controller 24. In one embodiment, the power monitor PM 74 monitors voltage. In one embodiment, the power monitor PM 74 monitors power factor. In one embodiment, the power monitor PM 74 monitors electrical power. In one embodiment, the power monitor PM 74 monitors current. A conventional recloser or circuit breaker 76 is coupled in series with the bus 66 and is coupled to the processor 69 in the local controller 26 via a data path 78, allowing monitoring and/or control of the recloser 76.

The processor 69 in the local controller 26 is coupled to the group controller 16 (FIG. 1) via data path 34. In this example, a conventional modem 79 is employed for bidirectional data transfer.

A voltage regulator 80 is coupled in series in the bus 66. The voltage regulator 80 is responsive to control signals delivered from the processor 69 in the local controller 26 via a data path 82, and the local controller 26 also is able to collect status data from the voltage regulator 80 via this data path.

Electrical power is then transferred downstream via the bus 66, which may include line voltage monitors LVM 84 disposed at strategic intervals and in data communication with the local controller 26. In one embodiment, a stepdown transformer, instrument transformer, potential transformer or transducer 86 located near the point of use transforms the intermediate voltage employed on the bus 66 to voltages suitable for sensing equipment such as a sensing module 88. The device 86 is calibrated to permit readings corresponding to user voltages but is not necessarily as precise as transformers used to transform intermediate transmission voltage levels to end use voltage levels.

The module 88 for measuring electrical parameters associated with delivered power and/or voltage is typically located at or near the transformer or device 86, between or near the transformer or device 86 and the end user 32 (FIG. 1), and may include power measurement devices PMD 89 for billing purposes. The module 88 is in data communication with the local controller 26 via a data path, in this example, via a radio 90 that exchanges radio signals with a radio 92 that is coupled to the processor 69 in the local controller 26.

Data communications via the various links may be effected using any known or conventional data transfer protocol and method, e.g., may be signals transmitted using American Standard Code II (ASCII) via an RS-232 serial data port, for example.

Figure 4:
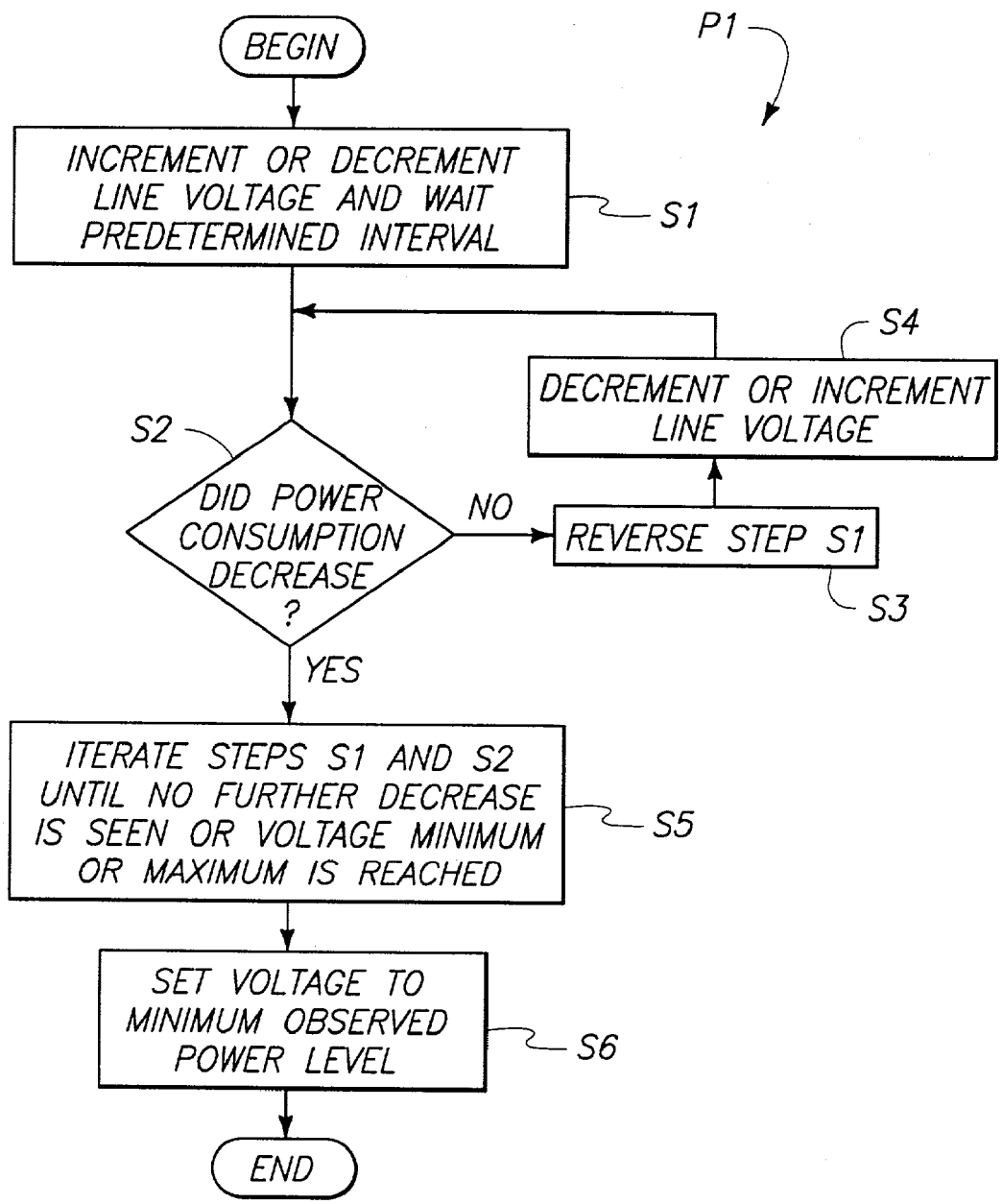
FIG. 4 is a simplified flow chart of a process for managing the electrical power distribution system of FIG. 1, in accordance with an embodiment of the present invention.

FIG. 4 is a simplified flow chart of a process P1 for managing the electrical power distribution system of FIG. 1, in accordance with an embodiment of the present invention.

The process P1 begins with a step S1. In the step S1, the local power controller 24 of FIGS. 1 through 3 increments or decrements at least one parameter associated with electrical power that is being distributed, such as line voltage. The process P1 then waits for a predetermined interval for the system to settle, which, in one embodiment, may range from about forty seconds to two minutes.

In a query task S2, the process P1 determines if the actions taken in the step S1 resulted in a decrease in power consumption. When the query task S2 determines that the actions taken in the step S1 resulted in an increase in power consumption, control passes to steps S3 and S4. When the query task S2 determines that the actions taken in the step S1 resulted in a decrease in power consumption, control passes to a step S5.

In the step S3, the actions taken in the step S1 are reversed. In other words, when the query task S2 determines that overall power consumption increases when the voltage decreases, the power controller 24 then returns to that voltage setting initially present and waits for the system to settle in the step S3. The process P1 then increases the voltage in the step S4 and again waits for the system to settle. Similarly, when the query task S2 determines that overall power consumption increases when the voltage increases, the power controller 24 returns to that voltage setting initially present and waits for the system to settle in the step S3. The process P1 then decreases the voltage in the step S4 and again waits for the system to settle. Following the step S4, control passes back to the query task S2.

The increments in voltage are subject to predetermined voltage maximum and minimum values, which may in turn depend on or be changed in response to system conditions. In other words, if the voltage is initially at the predetermined minimum, the process P1 tests the system with an increase in voltage but not a decrease.

When the query task S2 determines that the power consumption has decreased, the process P1 iterates the steps S1 and S2 (which may include steps S3 and S4) in a step S5. The iteration of the step S5 continues until no further decrease in power consumption is observed. In other words, the process P1 determines a line voltage consistent with reducing overall power consumption.

The process P1 then sets the line voltage to the optimum voltage or the voltage at which minimum power consumption occurred in a step S6. The process P1 then ends.

Figure 5:
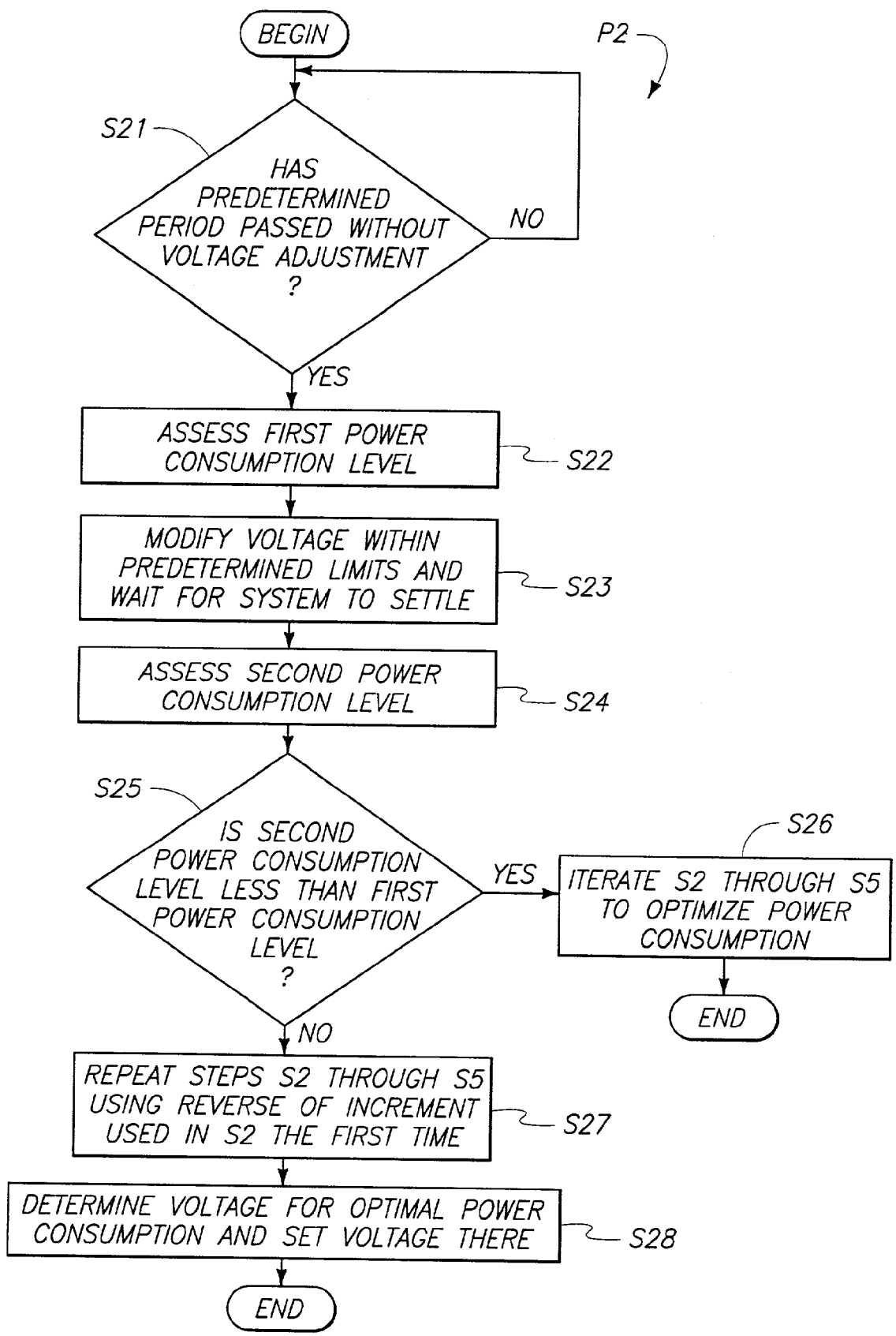
FIG. 5 is a simplified flow chart of a process for operating the power controller of FIG. 2, in accordance with an embodiment of the present invention.

FIG. 5 is a simplified flow chart of a process P2 for operating the power regulation devices 24 or the local controller 26 of FIG. 2, in accordance with an embodiment of the present invention. The process P2 begins with a query task S21.

In the query task S21, the process P2 determines when a predetermined interval has passed without a voltage adjustment occurring. In one embodiment, the predetermined interval is in a range of one half hour to one hour.

When the query task S21 determines that such an interval has not passed without a voltage adjustment, control passes back to the step S21. When the query task S21 determines that such an interval has passed without a voltage adjustment, control passes to a step S22.

In the step S22, a first power consumption level is measured. Control then passes to a step S23.

In the step S23, the power controller 24 adjusts a line voltage within predetermined limits and then waits for a predetermined interval for the system to settle. In one embodiment, the predetermined settling interval is in a range of from forty seconds to two minutes. Control then passes to a step S24.

In the step S24, a second power consumption level is measured. Control then passes to a query task S25.

In the query task S25, the process P2 determines when the second power level is less than the first power consumption level. When the query task S25 determines that the second power consumption level is less than the first power consumption level, control passes to a step S26. When the query task S25 determines that the second power consumption level is greater than the first power consumption level, control passes to a step S27.

In the step S26, the process P2 iterates the steps S22 through S25 to determine a line voltage associated with optimal power consumption levels and set the voltage to this level. The process P2 then ends.

In the step S27, the process P2 iterates the steps S22 through S25 but with the increment reversed from the increment or decrement employed in the first instantiation of the step S22. Control then passes to a step S28.

In the step S28, the process P2 determines a voltage for optimal power consumption in the system and sets the voltage to that level. The process P2 then ends.

Figure 6:
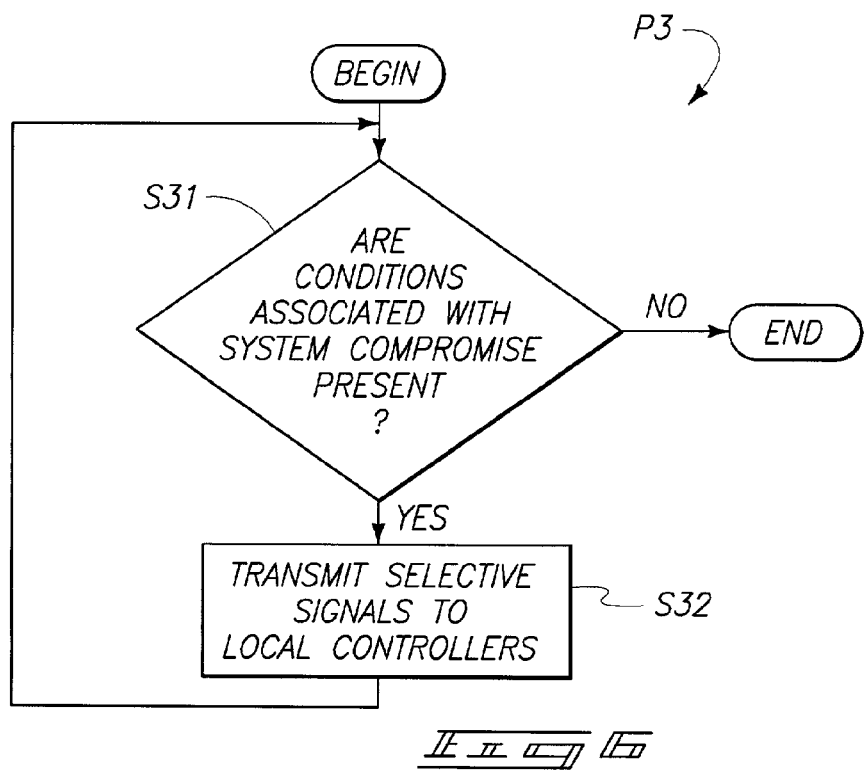
FIG. 6 is a simplified flow chart of a process for managing the electrical power distribution system of FIG. 1, in accordance with an embodiment of the present invention.

FIG. 6 is a simplified flow chart of a process P3 for managing the electrical power distribution system of FIG. 1, in accordance with an embodiment of the present invention. The process P3 begins in a query task S31.

In the query task S31, a group controller 16 determines when conditions associated with an increased probability of compromise of appropriate delivery of electrical power are present.

This may be forecast from observed power consumption trends and knowledge of prevailing conditions, analogous to situations invoking conventional power peak demand management techniques such as demand control, or it may be due to observable emergency electrical disturbance caused by a catastrophy of one sort or another. These kinds of situations have been dealt with in past using ON/OFF switching of one sort or another for shedding portions or all of the load.

When the query task S31 determines that such conditions are not present, the process P3 ends. When the query task S31 determines that such conditions are present, the group controller 16 transmits signals to local controllers 26 to cause them to set the power controllers 24 to predetermined values consistent with reduction of system power requirements in a step S32. Control then passes back to the query task S31.

For example, when the system is subject to severe loading, delivered voltage reduction may be implemented. The initial delivered voltage might, for example, have been 117 volts. As the voltage is being incrementally reduced towards 110 volts (representing the lower setpoint), and the system is being monitored, a minimum in power consumption might occur at 112 volts. The controller of the present invention will locate this minimum and can set the delivered voltage to that value. When system conditions will not support system loading, even at the lower setpoint, the setpoints may be reset or other corrective actions described herein may take place, depending on circumstances.

The present invention provides greater flexibility than prior systems in that incremental voltage or power adjustment is possible and practical, and may be automatically implemented. In one embodiment, and under appropriate conditions, some users, such as residential users and some types of commercial users, are denied power or are provided with reduced power at a first power level, while other users, such as hospitals, emergency facilities, law enforcement facilities and traffic control systems, are provided with power at a second power level that is greater than the first power level or are left at full power. In one embodiment, multiple tiers of users are provided with various grades of power reduction or non-reduction.

In some areas, hydroelectric or other electrical power generation systems have been extensively developed, while other areas may not lend themselves to such development. One example of the former occurs in the Pacific Northwest, where hydroelectric power generation capabilities have been extensively developed. As a result, power generation facilities in the Pacific Northwest are able to produce more power than may be needed in that geographical area from time to time.

A delivery area such as California, on the other hand, has extensive power needs but has limited ability to produce electrical power, and is bordered by desert areas that also do not lend themselves to hydroelectric power production. Thus, power stations in the Pacific Northwest may be able to, and in fact do, sell electricity generated in the Pacific Northwest to users in other places, such as California.

This leads to some fluctuations in demand in the Pacific Northwest power generation stations. At times, reductions in demand in the generation area (in this example, the Pacific Northwest) require that the system dissipate some of the electrical power that is generated there in order to preserve synchronization of the generators with each other and with other portions of the grid. In at least some cases, this need to dissipate electrical power is met by coupling large resistors across the generators. Typically, these are very large conventional nichrome wire resistors.

In some situations, the need to slew power into these resistors can arise rather abruptly. For example, when weather-, earthquake-, fire- or vehicular-driven events damage a portion of the distribution infrastructure in the delivery area or between the delivery area and the generation area, rapid changes in system dynamics are possible.

However, the controllers 16 and 24 of the present invention can be advantageously employed to increase voltage that is delivered in the generation area and in other portions of the grid that is serviced by generators in that area. The controllers 16 and 24 can adjust delivered voltages upward but stay within the predetermined limits appropriate for normal power service. As a result, system stability is increased.

Figure 7:
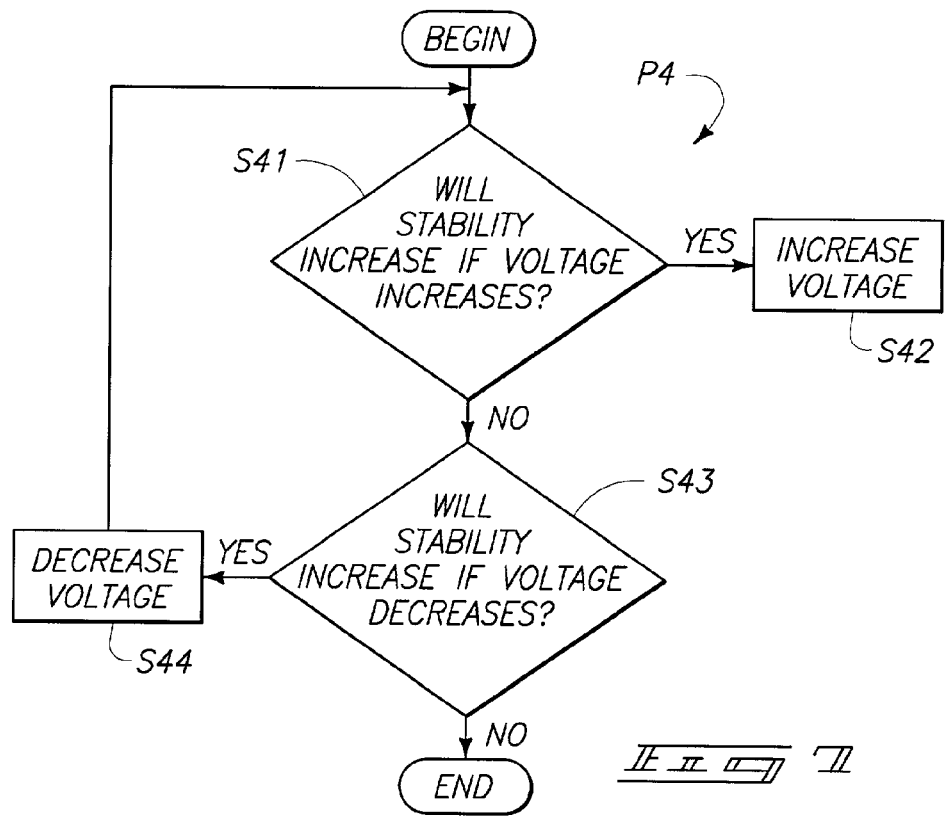
FIG. 7 is a simplified flow chart of a process for stabilizing the electrical power distribution system of FIG. 1, in accordance with an embodiment of the present invention.

FIG. 7 is a simplified flow chart of an exemplary process P4 for stabilizing the electrical power distribution system 10 of FIG. 1 using controllers such as 16 and 24, in accordance with an embodiment of the present invention.

The process P4 begins with a query task S41. In the query task S41, the process P4 determines when an increase in delivered voltage, within the predetermined voltage setpoints, will result in improved stability for the system 10.

When the query task S41 determines that an increase in voltage is appropriate for improving stability of the system 10, control passes to a step S42.

In the step S42, a controller in the system such as the group controller 16 increases voltage delivered to the users 32. Typically, the increase in voltage is incremental, as discussed hereinbefore, and is followed by a predetermined settling period and then data collection regarding system parameters. Control then passes back to the query task S41 to determine if another increase in voltage is appropriate for the system 10.

When the query task S41 determines that an increase in voltage is inconsistent with an increase in stability of the system 10, or is not appropriate for such system 10, control passes to the query task S43.

In the query task S43, the process P4 determines when a decrease in delivered voltage is appropriate for increasing stability for the system 10 and is consistent with the predetermined setpoints. When the query task S43 determines that a decrease in delivered voltage is appropriate for increasing system stability, control passes to a step S44.

In the step S42, a controller in the system such as the group controller 16 decreases voltage delivered to the users 32. Typically, the decrease in voltage is incremental, as discussed hereinbefore, and is followed by a predetermined settling period and then data collection regarding system parameters. Control then passes back to the query task S41 to determine if an increase in voltage is appropriate for the system 10. The process P4 then ends.

It will be appreciated that the processes P1 through P4 are cooperative with each other and with other processes carried out in the system 10. For example, when the system 10 no longer poses a stability issue, the process P4 may be terminated and power control may be determined by other factors in the system. Additionally, the processes P1 through P4 are structured to maintain delivered voltage at an appropriate level, such as within a range determined by programmable setpoints.

From the foregoing, it is apparent the present invention provides systems, processes and apparatus which can be utilized to monitor and manage electrical power distribution. Further, the disclosed systems, processes and apparatus permit power conservation and also can provide more robust power delivery under inclement power system loading conditions. In addition, the systems, processes and apparatus of the present invention are cost effective when compared with other power management devices.

In contrast to prior art systems, the present systems, processes and apparatus provide infinite variability of system parameters, such as multiple, different delivered voltage levels, within predetermined limits. For example, all users can be incrementally adjusted up or down together, or some users may be adjusted to a first degree while other users are adjusted to another degree or to separate, differing degrees. Such advantageously provides new flexibility in power distribution control, in addition to providing new methods of adjustment.

In compliance with the statute, the invention has been described in language more or less specific as to structural and methodical features. It is to be understood, however, that the invention is not limited to the specific features shown and described, since the systems, processes and apparatus herein disclosed comprise exemplary forms of putting the invention into effect. The invention is, therefore, claimed in any of its forms or modifications within the proper scope of the appended claims appropriately interpreted in accordance with the doctrine of equivalents.

The invention claimed is:

1. A system for adjustment of power consumption within a power grid comprising:
    a group controller;
    a plurality of sensors distributed within the power grid, the sensors being configured to assess conditions including power consumption and delivered voltage level and being configured to transmit data representative of the assessed conditions to the group controller; and
    a plurality of devices each configured to provide power control and each including a respective local controller associated with a respective one of the plurality of devices and configured to collect data from one or more sensors of the plurality of sensors that are associated with the respective one of the devices, each of the plurality of devices being configured to adjust an associated output electrical parameter in response to commands from either the group or local controller, individual ones of the plurality of devices being distributed to respective locations within the power grid, each of the plurality devices being configured to increase or decrease the associated output electrical parameter when either the group controller or the associated local controller determines that such will reduce system power consumption.

2. The system of claim 1, wherein the local controller associated with one of the devices is configured to:
    first determine that a predetermined interval has passed wherein a first associated output parameter level set by the one device has remained constant during the interval;
    first adjust the one device to change a first associated output electrical parameter value delivered by the one device from a first level to a second level;
    second determine power consumption after the first adjustment;
    compare power consumption after the first adjustment to power consumption prior to the first adjustment; and
    second adjust the one device to a second output electrical parameter value associated with reduced power consumption.

3. The system of claim 2, wherein the local controller configured to second adjust comprises a local controller configured to raise an output voltage level associated with the one device when the local controller configured to compare determines that the second level associated with reduced power consumption is greater than the first level.

4. The system of claim 1, wherein the associated output electrical parameter comprises an output voltage for the one device, and wherein the local controller is configured to dynamically determine which one or ones of an associated plurality of sensors is providing data most relevant to determining how to adjust the associated output electrical parameter.

5. The system of claim 1, wherein the group controller is further configured to:
    determine that conditions associated with an increased probability of compromise of large scale ability to deliver appropriate power may exist; and
    first adjust each of the plurality of devices individually, in response to the determination of conditions associated with increased probability of compromise of large scale ability to deliver appropriate power, to reduce power consumption.

6. The system of claim 1, wherein the group controller is further configured to:
  determine that conditions associated with an increased probability of compromise of large scale ability to deliver appropriate power may exist; and
  first adjust each of the plurality of devices individually to in response to the determination of conditions associated with increased probability of compromise of large scale ability to deliver appropriate power, wherein the controller configured to first adjust comprises a controller configured to:
  preserve power delivery at a first power level to a first group of power consumers; and
  reduce power delivery to a second, non-zero power level to a second group of power consumers.

7. The system of claim 1, wherein the local controller associated with each of the plurality of devices is also configured to adjust output voltage in response to electrical parameters measured downstream from the each of the plurality of devices, wherein the electrical parameters are selected from a group consisting of: a delivered voltage associated with the device, power controlled by the device, current controlled by the device and/or power factor associated with power controlled by the device.

8. The system of claim 1, wherein the local controller associated with each of the plurality of devices is also configured to adjust output voltage from the associated device in response to electrical parameters measured downstream from the each of the plurality of devices subject to constraints imposed by the group controller.

9. The system of claim 1, wherein the group controller is further configured to:
  determine that conditions associated with an increased probability of compromise of large scale ability to deliver appropriate power may exist; and
  first adjust each of the plurality of devices individually in response to the determination of conditions associated with an increased probability of compromise of large scale ability to deliver appropriate power, wherein the group controller configured to first adjust comprises a group controller configured to reduce power delivery to a selected group of the plurality of devices associated with a selected group of power consumers.

10. A power adjustment apparatus comprising:
  a local controller;
  one or more sensors distributed within a power grid, the sensors being configured to assess conditions including power consumption and delivered voltage level and being configured to transmit data representative of the assessed conditions to the local controller;
  a device associated with the one or more sensors and configured to adjust an output power level in response to commands from the local controller, the device being configured to be deployed at an associated location within the power grid, the device being configured to increase an associated output electrical parameter when the local controller determines that such will reduce power consumption.

11. The apparatus of claim 10, wherein the local controller is configured to:
  first determine and monitor power consumption associated with the device using data including data from the one or more sensors;
  denote that a predetermined interval has passed wherein a first level set by the device has remained constant during the interval;
  first adjust the device to change a first associated output electrical parameter value delivered by the device from the first level to a second level in response to first determining and denoting;
  second determine power consumption after the first adjustment using data including data from the one or more sensors;
  compare power consumption after the first adjustment to power consumption prior to the first adjustment; and
  second adjust the device to a second output electrical parameter value associated with reduced power consumption.

12. The apparatus of claim 11, wherein the local controller configured to second adjust comprises a local controller configured to raise an output voltage level associated with the device when the local controller configured to compare determines that the second level associated with reduced power consumption is greater than the first level.

13. The apparatus of claim 10, wherein the associated electrical parameter comprises at least one parameter selected from a group consisting of: a delivered voltage for the device, power controlled by the device, current controlled by the device and/or power factor associated with power controlled by the device.

14. The apparatus of claim 10, wherein the power adjustment apparatus is one of a plurality of such apparatus distributed through a power grid, and further comprising:
  a group controller configured to accept the transmitted data representative of the assessed conditions from each of the sensors and further configured to:
  determine that conditions associated with an increased probability of compromise of large scale ability to deliver appropriate power may exist; and
  first adjust each of a plurality of devices associated with the plurality of such apparatus individually in response to the determination of conditions associated with the increased probability of compromise of large scale ability to deliver appropriate power, wherein the group controller configured to first adjust is configured to:
  provide a first delivered voltage level to a first user; and
  provide a second delivered voltage level to a second user.

15. The apparatus of claim 14, wherein each of the plurality of devices is also configured to adjust output voltage in response to electrical parameters measured downstream from the device subject to constraints imposed by the group controller.

16. The apparatus of claim 10, wherein the power adjustment apparatus is one of a plurality of such apparatus distributed through a power grid, and further comprising:
  a group controller configured to accept the transmitted data representative of the assessed conditions from each of the sensors and further configured to:
  determine that conditions associated with an increased probability of compromise of large scale ability to deliver appropriate power may exist; and
  first adjust each of a plurality of devices associated with the plurality of such apparatus individually in response to the determination of conditions associated with increased probability of compromise of large scale ability to deliver appropriate power, wherein the group controller configured to first adjust comprises a group controller configured to:
  preserve power delivery to a first group of power consumers at a first power delivery level; and
  reduce power delivery to a second group of power consumers to a power level below the first power delivery level.

17. The apparatus of claim 10, wherein the device is also configured to adjust output voltage in response to electrical parameters measured downstream from the device.

18. The apparatus of claim 10, wherein the local controller is configured to:
   first determine and monitor power consumption associated with the device using data including data from the one or more sensors;
   denote that a predetermined interval has passed wherein a first level set by the device has remained constant during the interval;
   first adjust the device to change a first associated output electrical parameter value delivered by the device from the first level to a second level in response to first determining and denoting;
   second determine power consumption after the first adjustment using data including data from the one or more sensors;
   compare power consumption after the first adjustment to power consumption prior to the first adjustment; and
   second adjust the device to increase output voltage from the device when comparing indicates that such reduces power consumption.

19. The apparatus of claim 10, wherein the local controller is configured to:
   first determine and monitor power consumption associated with the device using data including data from the one or more sensors;
   denote that a predetermined interval has passed wherein a first level set by the device has remained constant during the interval;
   first adjust the device to change a first associated output electrical parameter value delivered by the device from the first level to a second level in response to first determining and denoting;
   second determine power consumption after the first adjustment using data including data from the one or more sensors;
   compare power consumption after the first adjustment to power consumption prior to the first adjustment;
   second adjust the device to increase output voltage from the device when comparing indicates that such reduces power consumption; and
   second adjust the device to decrease output voltage from the device when comparing indicates that such reduces power consumption.

20. A process for adjusting power consumption within a power grid including a controller and a plurality of sensors distributed within the power grid, the sensors being configured to assess conditions including power consumption and delivered voltage level and being configured to transmit data representative of the assessed conditions to the controller, the power grid further including a plurality of devices each configured to adjust output voltage in response to commands from the controller, individual ones of the plurality of devices being distributed to an associated location within the power grid, the process comprising:
   determining, by the controller, when an increase or decrease in an output parameter from one device of the plurality of devices will reduce system power consumption; and
   increasing or decreasing the associated output electrical parameter in response to the controller determining that such will reduce system power consumption; and
   wherein the associated electrical parameter comprises at least one parameter selected from a group consisting of: a delivered voltage for the one device, power controlled by the one device, current controlled by the one device and/or power factor associated with power controlled by the one device.

21. The process of claim 20, further comprising:
first determining, by the controller, that a predetermined interval has passed wherein a first delivered voltage level set by the one device has remained constant during the interval;
first adjusting, in response to commands from the controller, the one device to change a first associated output electrical parameter value delivered by the one device;
second determining, by the controller, power consumption after the first adjustment;
comparing, by the controller, power consumption after the first adjustment to power consumption prior to the first adjustment; and
second adjusting, in response to commands from the controller, the one device to a second output electrical parameter value associated with reduced power consumption.

22. The process of claim 21, wherein second adjusting comprises raising an output voltage level associated with the one device when comparing determines that the second level associated with reduced power consumption is greater than the first level.

23. The process of claim 20, wherein the controller is further configured to:
determine that conditions associated with increased probability of compromise of large scale ability to deliver appropriate power may exist; and
send commands to first adjust each of the plurality of devices individually to reduce output voltage level in response to the determination of conditions associated with increased probability of compromise of large scale ability to deliver appropriate power.

24. The process of claim 20, wherein the controller is further configured to:
determine that conditions associated with increased probability of compromise of large scale ability to deliver appropriate power may exist; and
send commands to first adjust each of the plurality of devices individually, in response to the determination of conditions associated with increased probability of compromise of large scale ability to deliver appropriate power, wherein the controller configured to first adjust comprises a controller configured to:
send first commands to instruct some of the plurality of devices to preserve power delivery to a first group of power consumers; and
send second commands to instruct others of the plurality of devices to reduce power delivery to a second group of power consumers.

25. The process of claim 20, wherein each of the plurality of devices is also configured to accept commands from the controller to adjust output voltage in response to an electrical parameter measured downstream from the each of the plurality of devices.

26. The process of claim 20, wherein each of the plurality of devices is also configured to adjust output voltage in response to electrical parameters measured downstream from the each of the plurality of devices subject to constraints imposed by the controller.

27. The process of claim 20, wherein the controller comprises a group controller configured to provide power setting commands to each of the plurality of devices and wherein the one device further includes a local controller, and further comprising:
determining by the local controller that a predetermined interval has passed wherein a first delivered voltage level set by the one device has remained constant during the interval;
first adjusting the one device to change a first associated, output electrical parameter value delivered by the one device in response to commands from the local controller;
determining power consumption after first adjusting by the local controller;
comparing power consumption after first adjusting to power consumption prior to first adjusting by the local controller; and
second adjusting the one device to a second output electrical parameter value associated with reduced power consumption in response to commands from the local controller, wherein commands from the local controller may be overridden by commands from the group controller.

28. The process of claim 20, further comprising:
determining, by the controller, that conditions associated with increased probability of compromise of large scale ability to deliver appropriate power may exist;
first adjusting each of the plurality of devices individually to reduce output voltage level in response to the determination of conditions associated with increased probability of compromise of large scale ability to deliver appropriate power; and
iterating the acts of determining and first adjusting until a predetermined limit is reached.

29. In a power adjustment apparatus including a controller, one or more sensors distributed within a power grid, the sensors being configured to assess conditions including power consumption and delivered voltage level and being configured to transmit data representative of the assessed conditions to the controller and a device configured to adjust output voltage in response to commands from the controller, the device being deployed at an associated location within the power grid, a process comprising:
determining, by the controller, that increasing an output electrical parameter associated with the device will reduce power consumption; and
increasing an output electrical parameter associated with the device in response to the controller determining that such will reduce power consumption; and
wherein increasing or decreasing the associated electrical output parameter comprises increasing or decreasing an output voltage for the device.

30. The process of claim 29, further comprising:
determining, by the controller, that a predetermined interval has passed wherein a first output electrical parameter level set by the device has remained constant during the interval;
first adjusting the device to change the first associated output electrical parameter value delivered by the device in response to commands from the controller;
determining, by the controller, power consumption after the first adjustment;
comparing, by the controller, power consumption after first adjusting to power consumption prior to first adjusting; and
second adjusting, in response to commands from the controller, the device to a second output electrical parameter value associated with reduced power consumption.

31. The process of claim 30, wherein second adjusting comprises raising an output voltage level associated with the device when comparing determines that the second level associated with reduced power consumption is greater than the first level.

32. The process of claim 29, wherein the controller is a local controller controlling the device, the device is one of a plurality of such devices distributed through a power grid, the grid including a group controller configured to accept transmitted data representative of the assessed conditions from each of the sensors and further configured send commands to each of the devices to set output voltage levels for each of the devices, commands from the group controller overriding commands from the local controller, the process further comprising:

determining, by the group controller, that conditions associated with increased probability of compromise of large scale ability to deliver appropriate power may exist; and transmitting, from the group controller to each of the plurality of devices, commands to first adjust each of the plurality of devices individually to set individual output voltage levels in response to determining that conditions associated with increased probability of compromise of large scale ability to deliver appropriate power may exist.

33. The process of claim 29, wherein the controller is a local controller controlling the device, the device is one of a plurality of such devices distributed through a power grid, the grid including a group controller configured to accept transmitted data representative of the assessed conditions from each of the sensors and further configured send commands to each of the devices to set output voltage levels for each of the devices, commands from the group controller overriding commands from the local controller, the process further comprising:

determining, by the group controller, that conditions associated with increased probability of compromise of large scale ability to deliver appropriate power may exist; and transmitting, from the group controller to each of the plurality of devices, commands to first adjust each of the plurality of devices individually to set individual output voltage levels in response to determining that conditions associated with increased probability of compromise of large scale ability to deliver appropriate power may exist, wherein the group controller is configured to:

send first commands to one group of the devices to preserve power delivery to a first group of power consumers; and send second commands to another group of the devices to reduce power delivery to a second group of power consumers.

34. The process of claim 29, further comprising adjusting an output voltage from the device in response the controller receiving data representing electrical parameters measured downstream from the device.

35. The process of claim 29, wherein the controller is a local controller controlling the device, the device is one of a plurality of such devices distributed through a power grid, the grid including a group controller configured to accept transmitted data representative of the assessed conditions from each of the sensors and further configured send commands to each of the devices to set output voltage levels for each of the devices, the process further comprising adjusting an output voltage from the device in response to the local controller receiving data representing electrical parameters measured downstream from the device subject to commands from the group controller.

* * * * *

(12) EX PARTE REEXAMINATION CERTIFICATE (8000th)
United States Patent
Wilson et al.

(10) Number: US 7,069,117 C1
(45) Certificate Issued: Jan. 18, 2011

(54) ELECTRICAL POWER DISTRIBUTION CONTROL SYSTEMS AND PROCESSES

(75) Inventors: Thomas L. Wilson, Spokane, WA (US); Kenneth M. Hemmelman, Spokane, WA (US)

(73) Assignee: Programmable Control Services, Inc., Spokane, WA (US)

Reexamination Request:
No. 90/009,512, Jun. 30, 2009

Reexamination Certificate for:
Patent No.: 7,069,117
Issued: Jun. 27, 2006
Appl. No.: 10/117,723
Filed: Apr. 1, 2002

(51) Int. Cl.
*G05D 11/00* (2006.01)

(52) U.S. Cl. .................... 700/295; 700/291; 363/25; 713/320; 327/101
(58) Field of Classification Search ................ None
See application file for complete search history.

(56) References Cited

U.S. PATENT DOCUMENTS 5,466,973 A 11/1995 Griffioen

OTHER PUBLICATIONS

Conservation Voltage Reduction (CVR) at Snohomish County PUD, IEEE Transactions on Power Systems, vol. 6, No. 3, Aug. 1991.

*Primary Examiner*—Zoila E Cabrera

(57) ABSTRACT

In one aspect, the present invention includes a power adjustment apparatus. The apparatus includes a local controller and one or more sensors distributed within a power grid. The sensors are configured to assess conditions including power consumption and delivered voltage level and are configured to transmit data representative of the assessed conditions to the local controller. The apparatus also includes a device associated with the one or more sensors, configured to adjust an output power level in response to commands from the local controller. The device is deployed at an associated location within the power grid. The device is configured to increase an associated output electrical parameter when the local controller determines that such will reduce power consumption.

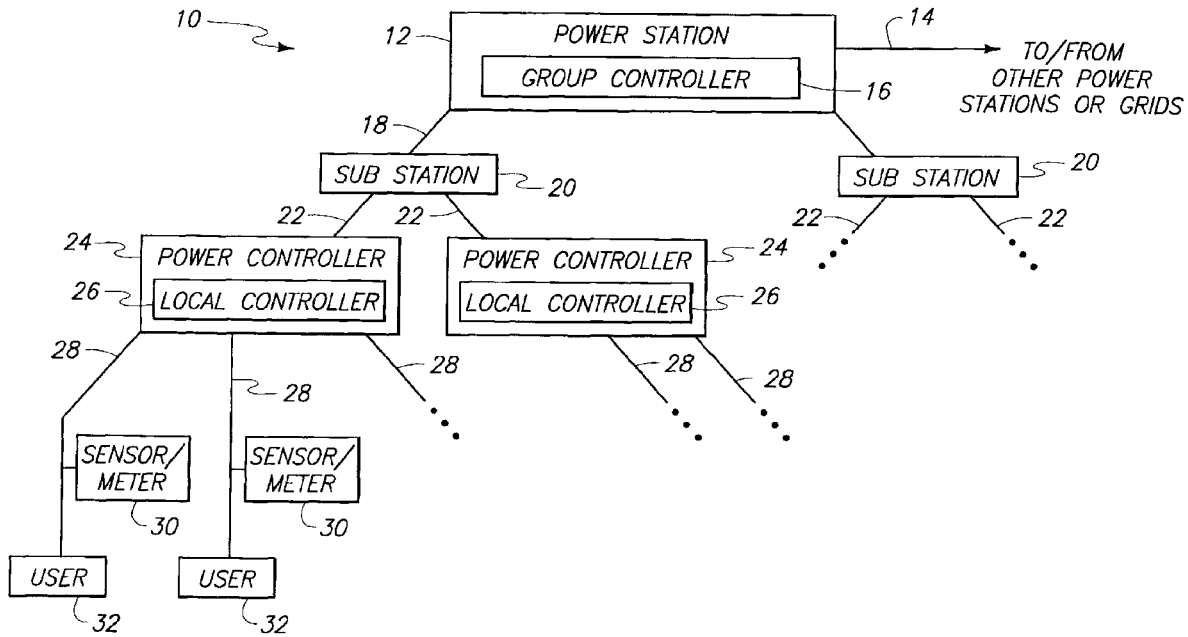

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10, 13 and 17 are determined to be patentable as amended.

Claims 1-9, 11-12, 14-16 and 18-35 were not reexamined.

10. A power adjustment apparatus comprising:
a local controller;
one or more sensors distributed within a power grid, the sensors being configured to assess conditions including power consumption and delivered voltage level and being configured to transmit data representative of the assessed conditions to the local controller; *and*
a device associated with the one or more sensors and configured to adjust an output power level in response to commands from the local controller, the device being configured to be deployed at an associated location within the power grid, the device being configured to increase an associated output electrical parameter when the local controller determines that such will reduce power consumption.

13. The apparatus of claim 10, *wherein the local controller is operative to determine that the increase in the associated output electrical parameter will reduce power consumption by analyzing the data representative of the assessed conditions, and* wherein the associated *output* electrical parameter comprises at least one parameter selected from a group consisting of:
a delivered voltage for the device, power controlled by the device, current controlled by the device and/or power factor associated with power controlled by the device.

17. The apparatus of claim 10, wherein the device is also configured to adjust output voltage *in response to the commands from the local controller, the local controller configured to generate the commands* in response to *the data, the data comprising sensed* electrical parameters measured downstream from the device *by the sensor*.

* * * * *